US012663377B2

(12) United States Patent
Benco

(10) Patent No.: US 12,663,377 B2
(45) Date of Patent: Jun. 23, 2026

(54) REAGENT STRIP COUNTERFEIT PROTECTION

(71) Applicant: Siemens Healthcare Diagnostics Inc., Tarrytown, NY (US)

(72) Inventor: John Benco, Holliston, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 730 days.

(21) Appl. No.: 18/000,942

(22) PCT Filed: Jun. 9, 2021

(86) PCT No.: PCT/US2021/036519
§ 371 (c)(1),
(2) Date: Dec. 7, 2022

(87) PCT Pub. No.: WO2021/252566
PCT Pub. Date: Dec. 16, 2021

(65) Prior Publication Data
US 2023/0228686 A1 Jul. 20, 2023

Related U.S. Application Data

(60) Provisional application No. 63/037,781, filed on Jun. 11, 2020.

(51) Int. Cl.
| *G01N 21/78* | (2006.01) |
| *B01L 3/00* | (2006.01) |
| *G01N 21/77* | (2006.01) |

(52) U.S. Cl.
CPC ............ *G01N 21/78* (2013.01); *B01L 3/5023* (2013.01); *B01L 2200/141* (2013.01); *B01L 2300/0654* (2013.01); *B01L 2300/069* (2013.01); *B01L 2300/0825* (2013.01); *G01N 2021/7759* (2013.01)

(58) Field of Classification Search
CPC ........... G01N 21/78; G01N 2021/7759; G01N 21/77; G01N 35/00663; G01N 2021/7786; G01N 21/6456; G01N 21/6408; G01N 2021/8488; G01N 2035/00673; G01N 2201/0221; G01N 21/8483; B01L 3/5023; B01L 2200/141; B01L 2300/0654; B01L 2300/069; B01L 2300/0825; A61P 35/00; A61P 43/00
See application file for complete search history.

(56) References Cited

U.S. PATENT DOCUMENTS

| 3,123,443 A | 3/1964 | Smeby |
| 3,212,855 A | 10/1965 | Mast et al. |

(Continued)

OTHER PUBLICATIONS

International Search Report and Written Opinion of International Application No. PCT/US2021/036519 dated Oct. 29, 2021.

(Continued)

*Primary Examiner* — Dennis White

(57) ABSTRACT
A reagent strip and a reagent analyzer for reading the reagent strip is described. The reagent strip includes a substrate, at least one reagent pad positioned on the substrate, and a photo luminescent phosphor spot positioned at a fixed location on the substrate. The photo luminescent phosphor spot is formulated to exhibit a predetermined addressable attribute.

22 Claims, 5 Drawing Sheets

(56) References Cited

U.S. PATENT DOCUMENTS

| | | | |
|---|---|---|---|
| 3,814,668 A | | 6/1974 | Blake et al. |
| 2011/0217207 A1* | | 9/2011 | Fujimoto .............. G01N 21/00 |
| | | | 422/68.1 |
| 2012/0043377 A1* | | 2/2012 | Haar ..................... A61B 90/98 |
| | | | 235/375 |
| 2012/0149007 A1 | | 6/2012 | Abrams et al. |
| 2015/0099307 A1* | | 4/2015 | Bartolome ......... G01N 21/6408 |
| | | | 436/95 |
| 2015/0105284 A1 | | 4/2015 | Willson et al. |
| 2015/0338387 A1* | | 11/2015 | Ehrenkranz ...... G01N 33/54366 |
| | | | 436/501 |
| 2016/0274104 A1 | | 9/2016 | Aminoff et al. |
| 2018/0154353 A1 | | 6/2018 | Glezer et al. |
| 2018/0292319 A1 | | 10/2018 | Battrell et al. |
| 2020/0011509 A1 | | 1/2020 | Ramer et al. |

OTHER PUBLICATIONS

Anil K. Deisingh, "Pharmaceutical counterfeiting", The Royal Society of Chemistry, Analyst 130, Dec. 14, 2004, pp. 271-279.

Paterson et al., "A Low-Cost Smartphone-Based Platform for Highly Sensitive Point-of-Care Testing with Persistent Luminescent Phosphors", Lab Chip, Mar. 14, 2017, 17(6): pp. 1-19.

Goux et al., "Evaluation of a nanophosphor lateral-flow assay for self-testing for herpes simplex virus type 2 seropositivity", PLoS ONE 14(12), Dec. 10, 2019, pp. 1-15.

Van den Eeckhout et al., "Persistent Luminescence in Eu2+-Doped Compounds: A Review", Materials 2010, 3, pp. 2536-2566.

Lisensky et al., "Experiments with Glow-in-the-Dark Toys: Kinetics of Doped ZnS Phosphorescence", Journal of Chemical Education, vol. 73 No. 11, Nov. 1996, pp. 1048-1051.

* cited by examiner

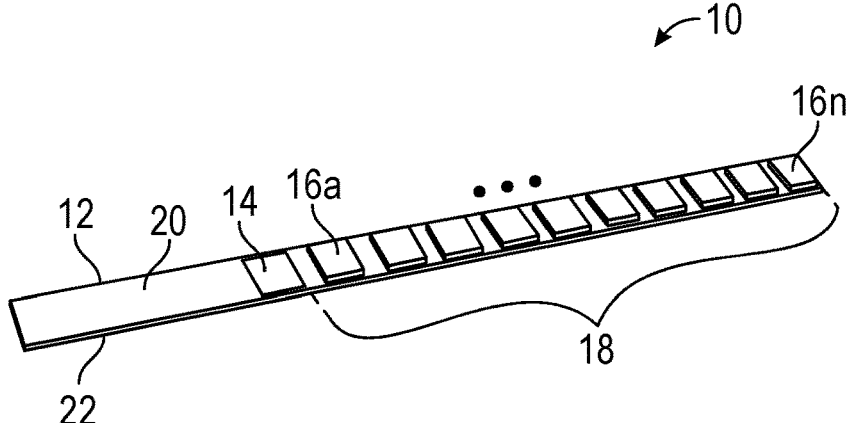
FIG. 1
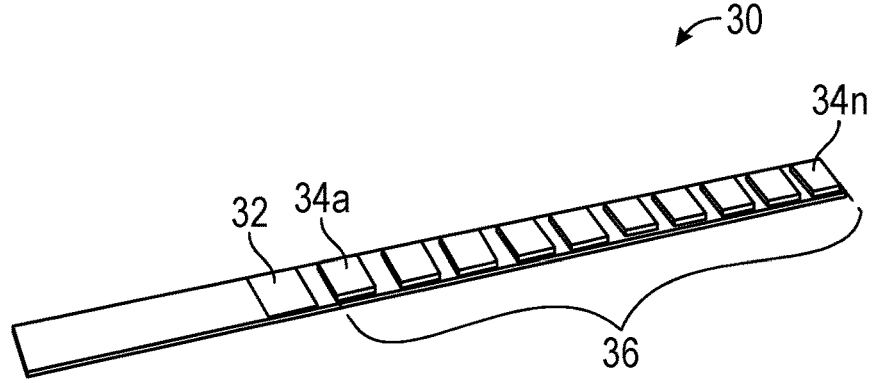
FIG. 2
(Prior Art)
FIG. 3

- Measure Max Intensity
- Measure Max Peak Wavelength

- Measure Intensity Decay Over Time

- Evaluate Decay Rate and Kinetic Profile
- Slope= Decay Rate Constant
- Linear Plot Confirms Kinetic Mechanism

REAGENT STRIP COUNTERFEIT PROTECTION

This application claims benefit under 35 USC § 119(e) of U.S. Provisional Application No. 63/037,781, filed Jun. 11, 2020. The entire contents of the above-referenced patent application(s) are hereby expressly incorporated herein by reference.

BACKGROUND

To satisfy the needs of the medical profession as well as other expanding technologies, such as the brewing industry, chemical manufacturing, etc., a myriad of analytical procedures, compositions, and tools have been developed, including the so-called "dip-and-read" type reagent test devices. Regardless of whether dip-and-read test devices are used for the analysis of a biological fluid or tissue, or for the analysis of a commercial or industrial fluid or substance, the general procedure involves a test device coming in contact with the sample or specimen to be tested, and manually or instrumentally analyzing the test device.

Dip-and-read reagent test devices enjoy wide use in many analytical applications, especially in the chemical analysis of biological fluids, because of their relatively low cost, ease of usability, and speed in obtaining results. In medicine, for example, numerous physiological functions can be monitored merely by dipping a dip-and-read reagent test device into a sample of body fluid or tissue, such as urine or blood, and observing a detectable response, such as a change in color or a change in the amount of light reflected from, or absorbed by the test device.

Many of the dip-and-read reagent test devices for detecting body fluid components are capable of making quantitative, or at least semi-quantitative, measurements. Thus, by measuring the detectable response after a predetermined time, a user can obtain not only a positive indication of the presence of a particular constituent in a test sample, but also an estimate of how much of the constituent is present. Such dip-and-read reagent test devices provide physicians and laboratory technicians with a facile diagnostic tool, as well as with the ability to gauge the extent of disease or bodily malfunction.

Illustrative of dip-and-read reagent test devices currently in use are products available from Siemens Healthcare Diagnostics Inc., under the trademark MULTISTIX, and others. Immunochemical, diagnostic, or serological test devices, such as these usually include one or more carrier matrix, such as absorbent paper, having incorporated therein a particular reagent or reactant system which manifests a detectable response (e.g., a color change) in the presence of a specific test sample component or constituent. Depending on the reactant system incorporated with a particular matrix, these test devices can detect the presence of glucose, ketone bodies, bilirubin, urobilinogen, occult blood, nitrite, and other substances. A specific change in the intensity of color observed within a specific time range after contacting the dip-and-read reagent test device with a sample is indicative of the presence of a particular constituent and/or its concentration in the sample. Some other examples of dip-and-read reagent test devices and their reagent systems may be found in U.S. Pat. Nos. 3,123,443, 3,212,855, and 3,814,668, the entire disclosures of which are hereby incorporated herein by reference.

Because of their widespread use, counterfeit dip-and-read reagent test devices have hit the market. However, performance of the counterfeit reagent test devices cannot be guaranteed and false readings may be obtained as a result of their use.

Accordingly, a need exists in the art for a counterfeit proof reagent test strip and systems and methods for authenticating same. It is to such methods and to reagent analyzers using such methods that the inventive concepts disclosed herein are directed.

SUMMARY

The inventive concepts disclosed herein generally relate to reagent strips and analyzers for the same, and more particularly, but not by way of limitation, to a method for preventing use of counterfeit reagent strips using a spot or strip of persistent luminescent phosphor as a security feature and configuring an analyzer to detect and analyze the persistent luminescent phosphor as will be described herein.

In one aspect, the inventive concepts disclosed herein are directed to a reagent strip having at least one security feature and analyzers for reagent strips capable of activating and reading the at least one security feature. More particularly, but not by way of limitation, inventive concepts disclosed herein are directed to a reagent strip having a persistent luminescent phosphor (PLP) spot which has one or more addressable attribute. At least one addressable attribute is an emission by the PLP spot in a quantifiable range of an imager when the PLP spot is excited by an illumination source in a spectrum which can be observed by the human eye. At least one attribute of the emission by the PLP spot is analyzed and must match predetermined parameters or the reagent strip will be rejected as counterfeit. Exemplary addressable attributes include, but are not limited to, luminosity (which indicates presence of the spot), luminosity intensity (each PLP compound has a specific maximum wavelength), luminosity decay rate and kinetic mechanism (for example, $1/\text{intensity} \propto \text{time}$, it should be noted that this is one example of a decay mechanism, however, other decay mechanisms are possible that may be used consistent with the inventive concepts disclosed herein). The presence of a PLP spot having multiple attributes can be used to create a security feature that would be difficult to counterfeit when one or more of the addressable attributes is used to verify the authenticity of the reagent strip.

While the inventive concepts disclosed herein will be described primarily in connection with automatic analyzers using a dip-and-read reagent test device, the inventive concepts disclosed herein are not limited to automatic analyzers or to dip-and-read reagent test devices. For example, a method according to the inventive concepts disclosed herein may be implemented with a manual analyzer, or may be implemented with an automatic analyzer using a reel of reagent test substrate having at least one PLP spot located at at least one predetermined location, and combinations thereof, as will be appreciated by a person of ordinary skill in the art having the benefit of the instant disclosure. Further, the inventive concepts disclosed herein may be implemented with any reagent strip imaging system which has a field of view with at least one read position in the field of view that can be illuminated by an illumination source.

In another exemplary embodiment, verification of a reagent strip may be accomplished by use of a smartphone.

BRIEF DESCRIPTION OF THE DRAWINGS

To assist those of ordinary skill in the relevant art in making and using the inventive concepts disclosed herein, reference is made to the appended drawings and schematics, which are not intended to be drawn to scale, and in which like reference numerals are intended to refer to the same or similar elements for consistency. For purposes of clarity, not every component may be labeled in every drawing. Certain features and certain views of the figures may be shown exaggerated and not to scale or in schematic in the interest of clarity and conciseness. In the drawings:

FIG. 1 is a perspective view of a reagent strip having a luminescent spot as a security feature in accordance with the inventive concepts disclosed herein.

FIG. 2 is a prior art reagent strip having an infrared band as a security feature.

FIG. 3 is a perspective view of a reagent strip having a luminescent spot and an infrared band as security features in accordance with the inventive concepts disclosed herein.

DETAILED DESCRIPTION

Figure 4:
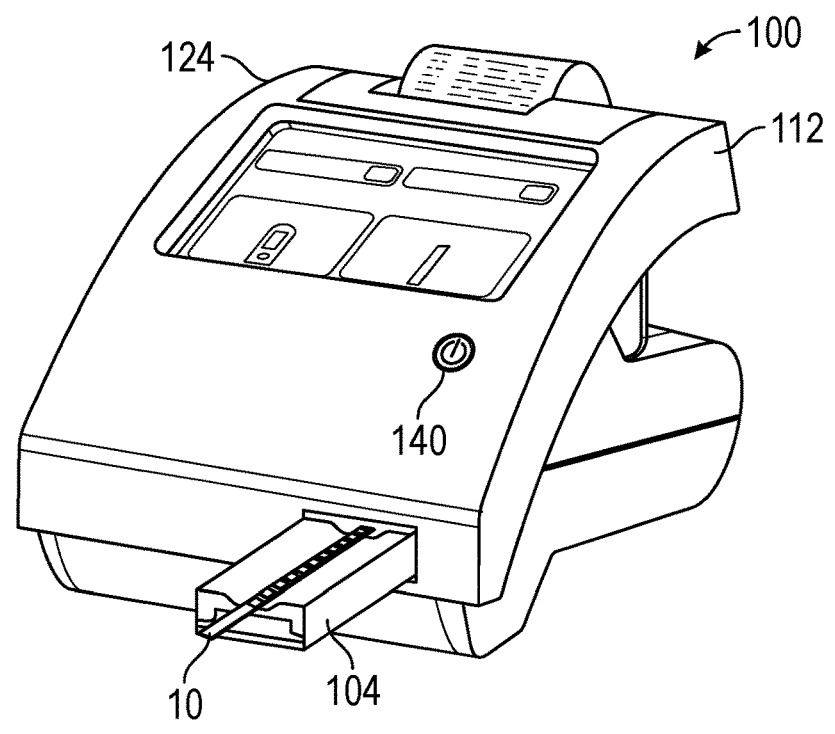
FIG. 4 is a perspective view of an exemplary embodiment of a reagent analyzer according to the inventive concepts disclosed herein, showing the reagent strip of FIG. 1 positioned on a travel surface of the reagent analyzer.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts disclosed herein may be practiced without these specific details. In other instances, well-known features have not been described in detail to avoid unnecessarily complicating the instant disclosure.

As used herein, the term "addressable attribute" means an attribute of a photo luminescent phosphor spot that can be determined by analyzing an optical signal emitted from the photo luminescent phosphor spot.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein "dry pad," "dry reagent pad," or "dry test strip" refer to a reagent pad or a row of reagent pads which does not have a volume of sample deposited thereon, or that does not have a sufficient amount of sample deposited thereon to react with the reagent. For example, a dry reagent pad can be the unreacted reagent pad prior to dispensing a volume of sample thereon.

As used herein "wet pad," or "wet reagent pad" refer to a reagent pad that has a volume of sample deposited thereon such that the reagent in the reagent pad may react with its target constituent if such constituent is present in the sample. A wet reagent pad may also have a volume of a negative control deposited thereon.

Finally, as used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

Referring now to FIG. 1, shown therein is an exemplary reagent strip 10 according to the inventive concepts disclosed herein. The reagent strip 10 may include a substrate 12, a photo luminescent phosphor (PLP) spot 14 positioned on, or otherwise associated with the substrate 12, and one or more, or a plurality of reagent pads 16a-n positioned on, or otherwise associated with the substrate 12.

The substrate 12 may be constructed of any suitable material, such as paper, photographic paper, polymers, fibrous materials, and combinations thereof, for example.

The PLP spot 14 may be formulated such that it would exhibit a specific intensity of luminescence, maximum peak wavelength, rate of decay and kinetics once excited by light. For instance, the PLP spot 14 may be a persistent luminescent phosphor compound such as zinc sulfide (ZnS) doped with copper (ZnS:Cu), cobalt (ZnS:Co), or both copper and cobalt (ZnS:Cu,Co), or strontium aluminate doped with europium and dysprosium (SrAl2O4:Eu2+,Dy3+), for example. These and other persistent luminescent phosphor compounds can be excited by an illumination source and will emit a visible light for a substantial time after the illumination source has been removed. Absorption of light from the illumination source causes excitation of electrons in the compound and produces nonequilibrium concentrations of electrons and holes in the compound. Light is emitted as the electrons recombine with the holes, a process that occurs at a rate dependent on the material that makes up the compound and the temperature (referred to herein as a luminosity decay rate). For instance, copper-doped zinc sulfide produces a yellow-green glow with a maximum wavelength of ~530 nm (520 nm to 540 nm) and the kinetics follow a second order decay rate where 1/intensity is linearly proportional with time. Thus, the resulting emission of visible light may be measured by an imager and four methods of security can be derived from the measured emissions: 1) presence of the compound determined by luminosity (e.g., light is emitted or light having a specific color is emitted), 2) maximum wavelength (each persistent luminescent phosphor compound has a specific maximum wavelength e.g., copper-doped zinc sulfide has a maximum wavelength of ~530 nm), 3) luminosity decay rate (each persistent luminescent phosphor compound has a specific luminosity decay rate), and 4) kinetic mechanism (each persistent luminescent phosphor compound has a specific kinetic mechanism e.g., if 1/intensity is linearly proportional with time then the kinetic mechanism is confirmed and the slope of the line is equal to the decay rate constant). While copper-doped zinc sulfide is used as an example, it should be noted that other persistent luminescent phosphor compounds, which have known characteristics as well, may be used to derive the four methods of security from measured emissions.

In some embodiments, the PLP spot 14 may be covered or sealed to protect the persistent luminescent phosphor compound from a liquid sample as the liquid sample is being tested. The cover or seal may be formed of any material capable of preventing liquid from contaminating the persistent luminescent phosphor compound while remaining substantially translucent so that light from an illumination source can pass through the cover or seal, and optical emissions from the persistent luminescent phosphor compound can be observed. The location of the PLP spot 14 on the substrate 12 can be fixed. In some embodiments, the PLP spot 14 can be separate from the reagent pads 16a-n, e.g., in a location on the substrate 12 that is devoid of any one or more of the reagent pads 16a-n.

Figure 5:
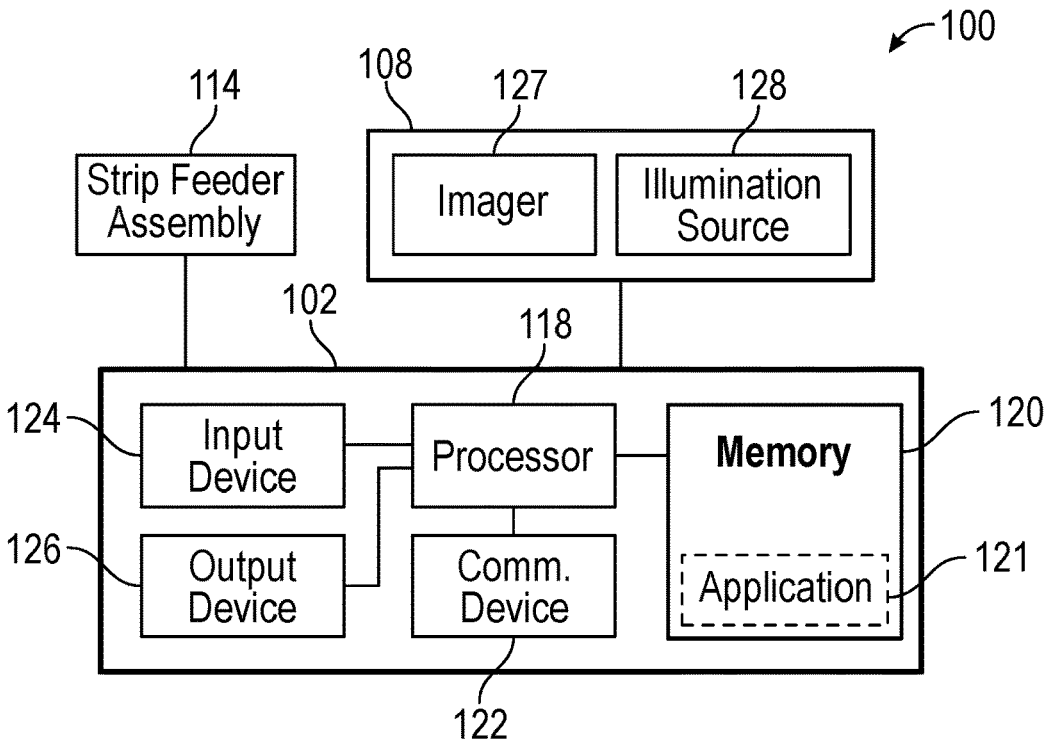
FIG. 5 is a diagrammatic view of the reagent analyzer of FIG. 4 constructed in in accordance with the inventive concepts disclosed herein.
Figure 6A:
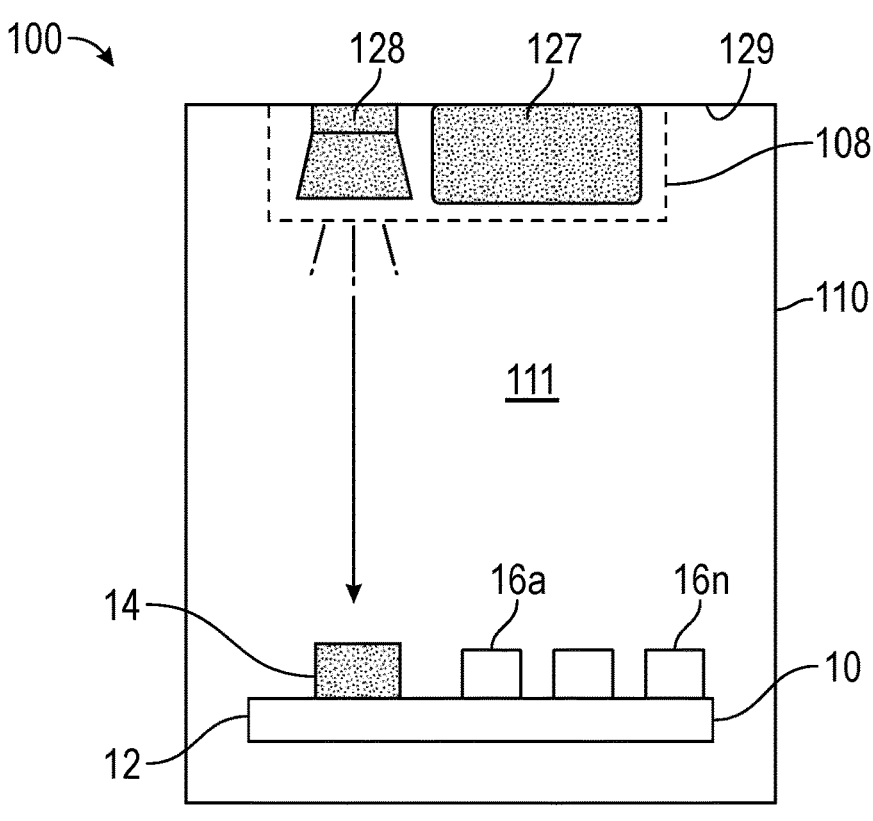
FIG. 6A is a diagrammatic view of an imager and an illumination source of the reagent analyzer of FIG. 4 illustrating an optical emission from the illumination source directed to the PLP spot of the reagent strip.
Figure 6B:
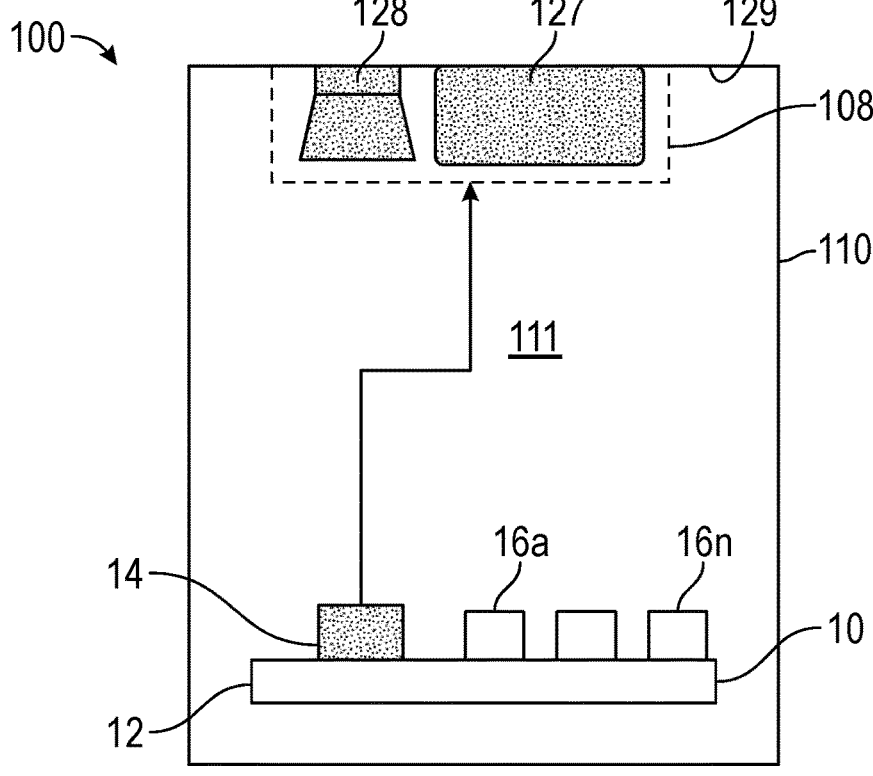
FIG. 6B is a diagrammatic view of the imager and the illumination source of the reagent analyzer of FIG. 4 illustrating an optical emission from the PLP spot of the reagent strip in reaction to being excited by the optical emission from the illumination source.

The reagent pads 16a-n may be arranged in a grid-like configuration on the substrate 12 so as to define one or more test strip 18, for example. In an exemplary embodiment, the reagent pads 16a-n may include fluidic or microfluidic compartments (not shown). The reagent pads 16a-n may be spaced apart a distance from one another so that adjacent reagent pads 16a-n may be simultaneously positioned at separate read positions within a field of view of an imaging system 108 (FIG. 5), for example. The substrate 12 may have a first side 20 and an opposed second side 22. The PLP spot 14 and the reagent pads 16a-n can be located on the first side 20, the second side 22, or the PLP spot 14 can be located on one of the first side 20 and the second side 22, and the reagent pads 26a-n can be located on another one of the first side 20 and the second side 22. The reagent strip 10 may be a multiple-profile reagent strip having multiple reagent pads 16a-n having different reagents. Further, in some exemplary embodiments, the reagent strip 10 may include one or more calibration chip or reference pad, which may have no reagent and may serve as a color reference, for example.

Each reagent pad 16a-n may include a reagent configured to undergo a color change in response to the presence of a target constituent such as a molecule, cell, or substance in a sample of a specimen deposited on the reagent pad 16a-n. The reagent pads 16a-n may be provided with different reagents for detecting the presence of different target constituents. Different reagents may cause one or more color change in response to the presence of a certain constituent in the sample, such as a certain type of analyte. The color developed by a reaction of a particular constituent with a particular reagent may define a characteristic discrete spectrum for absorption and/or reflectance of light for that particular constituent. The extent of color change of the reagent and the sample may depend on the amount of the target constituent present in the sample, for example.

The sample may be any bodily fluid, tissue, or any other chemical or biological sample, and combinations thereof, such as urine, saliva, or blood, for example. The sample may be in liquid form and may contain one or more target constituent such as bilirubin, ketones, glucose, or any other desired target constituent, for example. The presence and concentrations of these target constituent(s) in the sample may be determinable by an analysis of the color change undergone by the one or more reagent pad 16a-n at predetermined times after application of the sample to the reagent pad 16a-n and/or at predetermined read positions in the field of view of the imaging system 108, for example. This analysis may involve a color comparison of each reagent pad 16a-n to itself at different time periods after application of the sample and/or at different read positions in the field of view of the imaging system 108. In one exemplary embodiment a first read position may be selected as a reference position, and a second read position at which the reagent pad 16a-n is positioned after a predetermined period of time may be selected as a result position, and the test result may be determined from the color change between the reference position and the result position. In this way, the reagent strip 10 may assist in diagnosing the existence of a disease or other health problem by allowing a reagent analyzer 100 (FIG. 4) to make a qualitative and/or a quantitative or semi-quantitative measurement of a target constituent in a sample.

Shown in FIG. 2 is a prior art reagent strip 30 having an infrared strip 32, and reagent pads 34a-34n forming test strip 36. The infrared strip 32 provided a security feature in the prior art reagent strip 30.

Referring now to FIG. 3, shown therein is a reagent strip 40 constructed in accordance with one embodiment of the presently disclosed inventive concepts. The reagent strip 40 is similar to the reagent strip 10 of FIG. 1. Therefore, in the interest of brevity, only the differences will be described herein in detail. The reagent strip 40 is provided with a substrate 41, a PLP spot 42 on the substrate 41, an infrared strip 44 on the substrate 41, and at least one reagent pad 46 on the substrate 41 forming a test strip 48. Multiple reagent pads 46a-46n are shown by way of example.

Referring now to FIGS. 4, 5, 6A, and 6B, shown therein is an exemplary embodiment of a reagent analyzer 100 according to the inventive concepts disclosed herein. The reagent analyzer 100 may be an automatic reagent strip analyzer, for example. For the purposes of illustration, and not by way of limitation, the reagent analyzer 100 will be described using the reagent strip 10 described above with reference to FIG. 1.

Generally, the reagent analyzer 100 may include a controller 102, a strip tray 104 configured to hold one or more reagent strip 10, and an imaging system 108 within a housing 110. The housing 110 encloses a reading space 111 sized and configured to receive the reagent strip 10. The housing 110 may be constructed of an opaque material to prevent light from outside of housing 110 from interfering with light being generated in the reading space 111 as discussed below. The housing 110 may be constructed of two or more optically opaque component(s) joined together so as to form and enclose the reading space 111. The reagent analyzer 100 may also include an optional waste ramp assembly and a waste receptacle (not shown), for example for disposing of reagent strip 10 after the reagent strip 10 has been read by the imaging system 108. The housing 110 may also be implemented to house and protect the various components of the reagent analyzer 100, and to protect technicians and laboratory work surfaces from contamination, for example. The reagent analyzer 100 may be provided with a strip feeder assembly 114 for moving the one or more reagent strip 10 from the strip tray 104 into the reading space 111 of the housing 110, past the imaging system 108 to the waste receptacle. The strip feeder assembly 114 may include a conveyor, a set of drive wheels or the like.

The controller 102 may include a processor 118 operably coupled with a non-transitory computer-readable medium 120, a communication device 122, an input device 124, and an output device 126. The controller 102 may be operably coupled with the strip feeder assembly 114 and the imaging system 108, for example.

The processor 118 may be implemented as a single processor or multiple processors working together or independently to execute processor executable code, such as application 121, implementing the logic described herein to calibrate the reagent analyzer 100 as will be described below. Embodiments of the processor 118 may include a digital signal processor (DSP), a central processing unit (CPU), a microprocessor, a multi-core processor, an application specific integrated circuit, a field programmable gate array, and combinations thereof, for example. The processor 118 may be at a location where the reagent strip 10 is being analyzed, remotely, or combinations thereof. For example, the processor 118 may be within the housing 110, or remotely in a cloud-based computation service. In another embodiment, the processor 118 may include a first processor within the housing 110 and controlling the imaging system 108 to obtain the images of the optical signal, and a second processor receiving and analyzing the images to determine whether the optical signal generated by the PLP spot 14 includes at least one predetermined addressable attribute.

The non-transitory computer readable medium 120 can be implemented as RAM, ROM, flash memory or the like, and may take the form of a magnetic device, optical device, or any other device configured to store processor executable instructions and information in a non-transitory manner, for example. The non-transitory computer readable medium 120 can be a single non-transitory computer readable medium, or multiple non-transitory computer readable mediums functioning logically together or independently, for example. The processor executable code 121 can be stored in the non-transitory computer readable medium 120, read by the processor 118, and executed by the processor 118 to perform the logic described herein to authenticate the reagent strip 10 or 40 as will be described below.

The input device 124 may be capable of receiving information input from a user and/or processor 118, and transmitting such information to other components of the reagent analyzer 100. Implementations of the input device 124 may include, but are not limited to, a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The output device 126 may be capable of outputting information in a form perceivable by the user and/or processor 118. For example, implementations of the output device 126 may include, but are not limited to, a computer monitor, a screen, a touchscreen, a speaker, a website, a television set, a smart phone, a PDA, a cell phone, a fax machine, a printer, a laptop computer, combinations thereof, and the like, for example. It is to be understood that in some exemplary embodiments, the input device 124 and the output device 126 may be implemented as a single device, such as, for example, a touchscreen. It is to be further understood that as used herein the term user is not limited to a human being, and may comprise, a computer, a server, a website, a processor, a network interface, a human, a user terminal, a virtual computer, combinations thereof, and/or the like, for example.

The strip tray 104 may be configured to accept the reagent strip 10, for example, and advance the reagent strip 10 so that the reagent pads 16a-n are positioned in the reader space 111, and in a field of view of the imaging system 108. While the strip tray 104 is illustrated as a retractable mechanism, it should be noted that the strip tray 104 may be implemented as a conveyor belt, a ratchet mechanism, a sliding ramp, or a strip-gripping or pulling mechanism, for example, configured to work with the strip feeder assembly 114 to advance the reagent strip 10 into the field of view of the imaging system 108. In some exemplary embodiments, the strip tray 104 and/or the strip feeder assembly 114 may be operably coupled with the controller 102 and configured to move the reagent strip 10 (e.g., in an intermittent and stepwise manner) with a predetermined speed and delay time between each move so that each PLP spot 14, reagent pad 16a-n, and/or each test strip 16 can be positioned at two or more read positions across the field of view of the imaging system 108 at known intervals of time, for example.

The imaging system 108 may include an imager 127 and an illumination source 128, which may be fixed relative to the strip tray 104 and/or the strip feeder assembly 114, for example. In one embodiment, the imager 127 and the illumination source 128 are mounted to an inside surface 129 of the housing 110.

The imager 127 may be implemented and function as any desired reader, and may be supported at a location above the strip tray 104 or other suitable location), so that a field of view of the imager 127 includes substantially the entire strip tray 104, for example. In another embodiment, the imaging system 108 may include a mirror over the strip tray 104, to direct light to the imager 127 that is located beside the strip tray 104, for example. The imager 127 may be configured to detect or capture an image or an optical signal indicative of a luminosity intensity, a luminescence, a reflectance value, a color value, and the like of the PLP spot 14 and/or reagent pads 16a-n positioned at each of at least two or a plurality of read positions in the field of view of the imager 127, for example. It is to be understood, however that in some exemplary embodiments, the field of view of the imager 127 may include only a portion of the strip tray 104. The imager 127 may include any desired digital or analog imager, such as a digital camera, an analog camera, a CMOS imager, a diode, and combinations thereof. The imager 127 may also include a lens system, optical filters, collimators, diffusers, or any other optical-signal processing devices, for example. Further, in some embodiments (not shown), imaging system 108 may include a first imager (not shown) which is an optical imager configured to detect an optical signal in the visible spectrum, and may further include a second imager (not shown) configured to detect an optical signal not in the visible spectrum such as a microwave imaging system, an X-ray imaging system, and other desired imaging systems, for example. Non-exclusive examples of the imager 127 include optical imaging systems, spectrophotometers, gas chromatographs, microscopes, infrared sensors, and combinations thereof, for example.

The illumination source 128 may be located adjacent to the imager 127 and on the first side 20 of the reagent strip 10. The illumination source 128 may be implemented as one or more of a light emitting diode, a light bulb, a laser, an incandescent bulb or tube, a fluorescent light bulb or tube, a halogen light bulb or tube, or any other desired light source or object configured to emit an optical signal having any desired intensity, wavelength, frequency, or direction of propagation, for example. The illumination source 128 may be oriented such that substantially the entire field of view of the imager 127 is illuminated by the illumination source 128. In some exemplary embodiments, the illumination source 128 may be operably coupled with the controller 102 so that control and/or power signals may be supplied to the illumination source 128 by the controller 102. The optical signals emitted by the illumination source 128 may be conditioned or processed by one or more optical or other systems (not shown), such as filters, diffusers, polarizers, lenses, lens systems, collimators, and combinations thereof, for example. During a verification phase, an optical signal is emitted by the illumination source 128 for a predetermined amount of time and/or at a predetermined intensity, such as by control and power signals supplied by the controller 102, to activate a security feature (such as the PLP spot 14 described in FIG. 1). During a testing phase, the intensity of the optical signal emitted by the illumination source 128 is maintained substantially constant through the testing phase, such as by control and power signals supplied by the controller 102.

In some exemplary embodiments more than one illumination source 128 may be implemented, such as a first and a second illuminations source 128, and such first and second illuminations source 128 may have different locations and/or orientations so that the first and second illuminations sources 128 may cooperate to illuminate substantially the entire field of view of the imager 127 (e.g., substantially the entire strip tray 104). The first and second illuminations sources 128 may emit optical signals having different intensities, for example.

In one embodiment, the imaging system 108 may be operably coupled with the processor 118 so that one or more power and/or control signals may be transmitted to the imager 127 and/or to the illumination source 128 by the controller 102, and so that one or more signals may be transmitted from the imager 127 to the processor 118, for example.

The imager 127 may be configured to detect or capture one or more optical or other signals indicative of a luminescence and/or reflectance value of PLP spot 14 and reagent pads 16a-n at any desired read position, and to transmit a signal indicative of the luminescence and/or reflectance value of the PLP spot 14 and/or reagent pads 16a-n at each read position to the processor 118, for example. One or more optical signals having wavelengths indicative of the luminescence and/or reflectance value of the PLP spot 14 and/or reagent pads 16a-n may be detected by the imager 127 at each read position, for example. The signal transmitted to the processor 118 by the imager 127 may be an electrical signal, an optical signal, and combinations thereof, for example. In one embodiment, the signal is in the form of an image file having a matrix of pixels, with each pixel having a color code indicative of its luminescence and/or reflectance value. In an exemplary embodiment, the image file may have two or more predetermined regions of pixels, each predetermined region of pixels corresponding to a read position of one of the PLP spot 14 and/or the reagent pads 16a-n in the field of view of the imager 127.

The processor 118 may determine the color of emissions from PLP spot 14 when activated and/or reflectance value or the color change of reagent pad 16a-n and/or a test strip 18 along with a sample (e.g., urine) disposed on the reagent pad 16a-n and/or test strips 18, based on signals detected by the imager 127, for example. The color of the PLP spot 14 emissions and/or reflectance value or the color change of reagent pad 16a-n and/or a test strip 18 may be determined based upon the relative magnitudes of the reflectance signals of various color components, for example, red, green, and blue reflectance component signals. For example, the color of PLP spot 14 emissions may be translated into a standard color model, which typically includes three or four values or color components (e.g., RGB color model, including hue, saturation, and lightness (HLS) and hue, saturation, and value (HSV) representation of points and/or CMYK color model, or any other suitable color model) whose combination represents a particular color. In some embodiments the imager 127 may detect multiple optical signals, with each detected signal having one or more color components, such as a red component signal, a green component signal, and a blue component signal, for example, and each of the component signals may be transmitted to the processor 118 via the same or separate communication link, such as a data bus. In some exemplary embodiments, the imager 127 may detect a single optical signal at each read position, and the processor 118 may translate a signal received from the imager 127 into separate color component signals such as a red component signal, a green component signal, and a blue component signal, for example.

Based upon an analysis of a magnitude of the optical signal detected by the imager 127, the processor 118 may assign the sample to one of a number of categories, e.g., a first category corresponding to no target constituent present in the sample, a second category corresponding to a small concentration of target constituent present in the sample, a third category corresponding to a medium concentration of target constituent present in the sample, and a fourth category corresponding to a large concentration of target constituent present in the sample, for example.

Further, the imager 127 may detect an optical signal indicative of a color or a reflectance value of emissions from the PLP spot 14 at any time interval after excitation by the illumination source 128, and regardless of the particular read position of the PLP spot 14, for example. In one exemplary embodiment, a video, or a sequence of images may be captured of the PLP spot 14 at a variety of time intervals after excitation by the illumination source 128 as the reagent strip 10 is advanced between two or more read positions.

In one embodiment, the controller 102 and the imaging system 108 are components of a smart phone. The smart phone may be placed onto the housing 110 so as to provide the configuration shown in FIG. 6A in which the imaging system 108 is within the reader space 111, and an opaque portion of the smart phone forms a portion of the housing 110.

Figure 7:
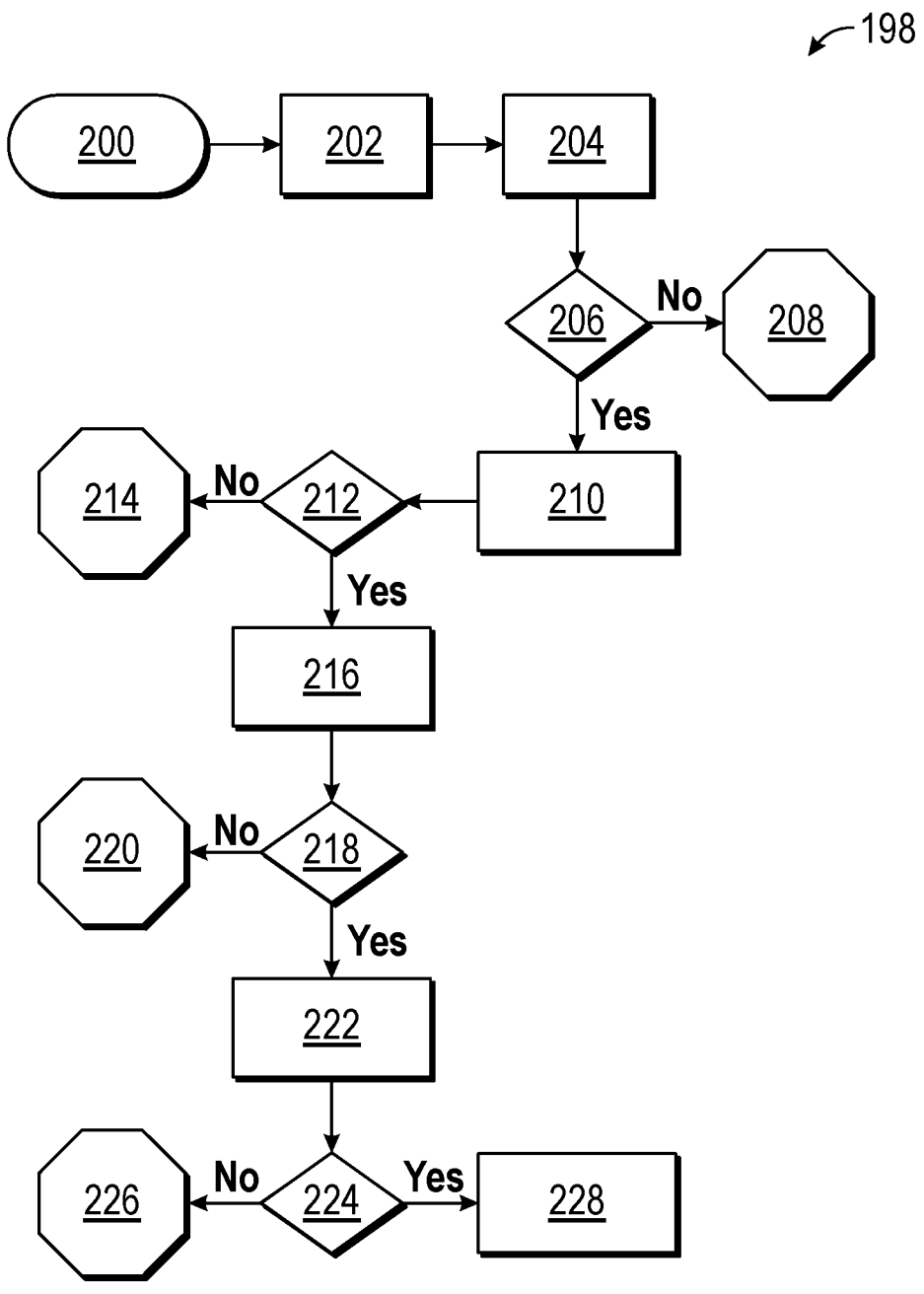
FIG. 7 is a diagram showing the steps of an exemplary embodiment of a reagent strip verification method according to the inventive concepts disclosed herein.

Reagent strips are vulnerable to counterfeiting. When a counterfeit reagent strip is used, readings from a reagent analyzer may be prone to errors if the reagent or reactant system (such as reagent pads 16a-n) are not calibrated for that particular reagent analyzer. Thus, performance of reagent analyzers cannot be guaranteed and false readings may be obtained. Adding a security feature that is difficult to reproduce ensures that only correctly calibrated or authentic reagent strips are analyzed. To that end, a verification routine 198 as shown in FIG. 7, may be carried out by the reagent analyzer 100. The verification routine 198 determines whether one or more than one addressable attribute is present within the PLP spot 14. In one embodiment, the verification routine 198 proceeds as set forth below.

In step 200 the strip tray 104 and/or the strip feeder assembly 114 advances a reagent strip 10 into the field of view of the imager 127 of the imaging system 108. The strip tray 104 desirably advances the reagent strip 10 such that a predetermined area where the PLP spot 14 should be located is positioned at a known read position of the field of view of the imager 127.

In step 202, the reagent strip 10 is illuminated by the illumination source 128 and, after a predetermined time (e.g. 100 ns) the imager 127 receives at least one optical signal from the reagent strip 10 including one or more components, such as a red component signal, a green component signal, and a blue component signal, for example, and each of the component signals may be transmitted to the processor 118 via the same or separate communication link, such as a data bus. In some exemplary embodiments, the imager 127 may detect a single optical signal at each read position, and the processor 118 may translate a signal received from the imager 127 into separate color component signals such as a red component signal, a green component signal, and a blue component signal, for example.

In step 204, the processor 118 analyzes the optical signal detected by the imager 127 to detect an optical emission (light), or light having a specific color emitted from the predetermined area.

In step 206, the processor determines if light, or light having a specific color, was emitted from the predetermined area indicating the presence of a persistent luminescent phosphor or, in other words, the presence of the PLP spot 14.

If the processor 118 determines that the PLP spot 14 is not present, in step 208 the reagent strip 10 is rejected and the analysis ends.

If the processor 118 determines that the PLP spot 14 is present, in step 210 the processor 118 further analyzes the optical signal detected by the imager 127 to determine a maximum wavelength of the PLP spot 14.

In step 212, the maximum wavelength of the PLP spot 14 is compared to a maximum wavelength of an expected persistent luminescent phosphor compound to determine if the PLP spot 14 consists of an expected persistent luminescent phosphor compound. Because each persistent luminescent phosphor compound has a specific maximum wavelength (e.g., copper-doped zinc sulfide with has a maximum wavelength of ~530 nm (generally defined as a range between 520 nm and 540 nm)), the processor 118 will be able to determine if the PLP spot 14 consists of the expected persistent luminescent phosphor by comparing the maximum wavelength of the PLP spot 14 to the maximum wavelength of the expected persistent luminescent phosphor.

If the processor 118 determines that the maximum wavelength of the PLP spot 14 does not match the maximum wavelength of the expected persistent luminescent phosphor, in step 214 the reagent strip 10 is rejected and the analysis ends. The reagent strip 10 can be rejected by not conducting a test of any of the reagent pads 16a-n, or not reporting any test results with respect to any of the reagent pads 16a-n. If a test is run on at least one of the reagent pads 16a-n, then such test results may not be stored.

If the processor 118 determines that the maximum wavelength of the PLP spot 14 matches the maximum wavelength of the expected persistent luminescent phosphor compound, in step 216 the processor 118 further analyzes the optical signal detected by the imager 127 to determine the luminosity decay rate of the PLP spot 14. Because each persistent luminescent phosphor compound has a specific luminosity decay rate (sometimes referred to as afterglow or afterglow decay rate), the processor 118 will be able to determine whether or not the luminosity decay rate of the PLP spot 14 matches an expected luminosity decay rate consistent with the expected persistent luminescent phosphor.

If the processor 118 determines that the luminosity decay rate of the PLP spot 14 does not match the luminosity decay rate of the expected persistent luminescent phosphor, in step 220 the reagent strip 10 is rejected and the analysis ends. The reagent strip 10 can be rejected by not conducting a test of any of the reagent pads 16a-n, or not reporting any test results with respect to any of the reagent pads 16a-n. If a test is run on at least one of the reagent pads 16a-n, then such test results may not be stored.

If the processor 118 determines that the luminosity decay rate of the PLP spot 14 matches the luminosity decay rate of the expected persistent luminescent phosphor compound, in step 222 the processor 118 further analyzes the optical signal detected by the imager 127 to determine a kinetic mechanism of the PLP spot 14.

If the processor 118 determines that the kinetic mechanism of the PLP spot 14 does not match the kinetic mechanism of the expected persistent luminescent phosphor, in step 226 the reagent strip 10 is rejected and the analysis ends. The reagent strip 10 can be rejected by not conducting a test of any of the reagent pads 16a-n, or not reporting any test results with respect to any of the reagent pads 16a-n. If a test is run on at least one of the reagent pads 16a-n, then such test results may not be stored.

If the processor 118 determines that the kinetic mechanism of the PLP spot 14 matches the kinetic mechanism of the expected persistent luminescent phosphor compound, in step 228 the processor 118 further analyzes one or more of the reagent pad 16a-n of the reagent strip 10 as described above.

The verification routine 198 may be implemented as a set of processor executable instructions or logic stored in the non-transitory computer readable medium 120, which instructions or logic when executed by the processor 118, cause the processor 118 to carry out the logic to perform the steps as described above.

It is to be understood that the steps disclosed herein may be performed simultaneously or in any desired order. For example, one or more of the steps disclosed herein may be omitted, one or more steps may be further divided in one or more sub-steps, and two or more steps or sub-steps may be combined in a single step, for example. Further, in some exemplary embodiments, one or more step may be repeated one or more times, whether such repetition is carried out sequentially or interspersed by other steps or sub-steps.

Additionally, one or more other step or sub-step may be carried out before, after, or between the steps disclosed herein, for example.

For example, in some embodiments only one of the addressable attributes of the PLP spot 14 may be used to verify the authenticity of reagent strip 10. For instance, the reagent analyzer 100 may be programmed to determine the presence of an optical emission when a predetermined area of the reagent strip 10 is illuminated by the illumination source 128 (steps 200-206 above). The optical emission indicating the presence of persistent luminescent phosphor, or, in other words, the PLP spot 14. If the PLP spot 14 is detected, the reagent analyzer 100 may be programmed to cause the processor 118 to further analyze one or more of the reagent pad 16a-n of the reagent strip 10 as described above. In some embodiments, the reagent analyzer 100 may be programmed to determine a maximum intensity of luminescence at a predetermined time after exposure to illumination from the illumination source 128. Because intensity of luminescence is specific to a given persistent luminescent phosphor compound, the intensity of luminescence may be used to determine if the PLP spot is made up of an expected persistent luminescent phosphor compound.

In another embodiment, the reagent analyzer 100 may be programmed to use two addressable attributes of the PLP spot 14 to verify authenticity. For instance, the reagent analyzer 100 may be programmed to determine the presence of the PLP spot 14 as described above and determine a maximum wavelength of the PLP spot 14 and compare the maximum wavelength of the PLP spot 14 to a maximum wavelength of an expected persistent luminescent phosphor compound. If the presence of the PLP spot 14 is detected and the maximum wavelengths match, the reagent analyzer 100 may be programmed to cause the processor 118 to further analyze one or more of the reagent pad 16a-n of the reagent strip 10 as described above. If the presence of the PLP spot 14 is not detected, or the maximum wavelengths do not match, the reagent strip 10 would be rejected as counterfeit. It should be noted that maximum wavelength is used as an example of an addressable attribute of the PLP spot 14 that may be used in this embodiment. However, any one of the maximum wavelength, luminescent decay rate, or kinetic mechanism may be used.

In another embodiment, the reagent analyzer 100 may be programmed to use three addressable attributes of the PLP spot 14 to verify authenticity. In addition to detection of the PLP spot 14 as described above, the reagent analyzer 100 may be programmed to detect any two of maximum wavelength, luminescent decay rate, or kinetic mechanism and compare them to a maximum wavelength, luminescent decay rate, or kinetic mechanism of an expected persistent luminescent phosphor compound. If the presence of the PLP spot 14 is detected and the two other addressable attributes match, the reagent analyzer 100 may be programmed to cause the processor 118 to further analyze one or more of the reagent pad 16a-n of the reagent strip 10 as described above. If the presence of the PLP spot 14 is not detected, or either one of or both of the other two addressable attributes do not match, the reagent strip 10 would be rejected as counterfeit.

The characteristics of the expected persistent luminescent phosphor compound may be stored in the non-transitory computer readable medium 120 as a positional look-up data table or in any desired format, for example.

Figure 8:
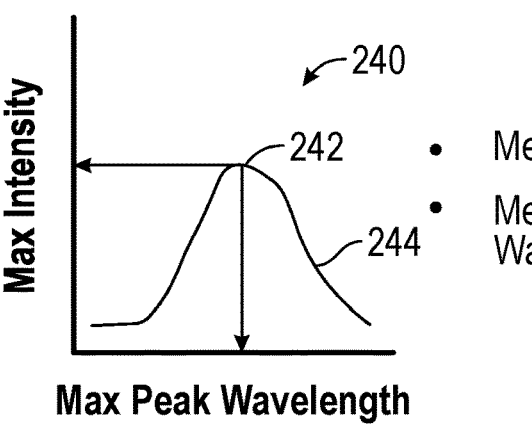
FIG. 8 is a diagram showing a maximum wavelength of an exemplary persistent luminescent phosphor.

Referring now to FIG. 8, shown therein is a diagrammatic view of an exemplary maximum wavelength 240 addressable attribute having a wavelength peak 242 of a waveform 244. The wavelength peak 242 represents the highest intensity of the waveform 244 at a given time. Maximum wavelength is measured from wavelength peak 242 to a second wavelength peak (not shown) of the waveform 244. Because maximum wavelength is specific to a given persistent luminescent phosphor compound, the maximum wavelength 240 addressable attribute may be used as described above to identify which persistent luminescent phosphor compound is present on a reagent strip 10, for instance.

Figure 9:
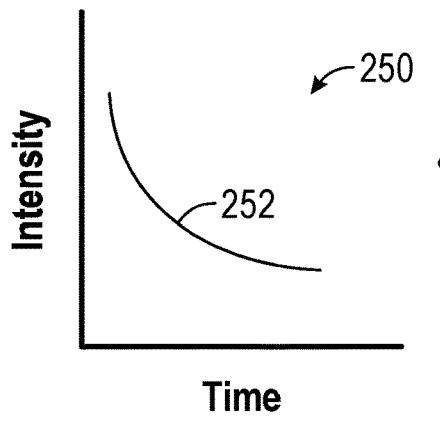
FIG. 9 is a diagram showing a luminosity decay of an exemplary persistent luminescent phosphor where a slope equals a decay rate constant.

Referring now to FIG. 9, shown therein is a diagrammatic view of an exemplary luminosity decay rate addressable attribute 250. The luminosity decay rate 250 addressable attribute is shown as a plotted curve 252 representing an intensity of an optical emission over time. Because luminosity decay rate is specific to a given persistent luminescent phosphor compound, the luminosity decay rate 250 may be used to identify which persistent luminescent phosphor compound is present on a reagent strip 10, for instance.

Figure 10:
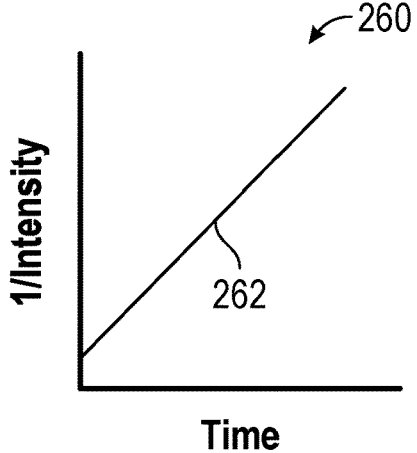
FIG. 10 is a diagram showing a kinetic mechanism of an exemplary persistent luminescent phosphor.

Referring now to FIG. 10, shown therein is a diagrammatic view of an exemplary kinetic mechanism 260 addressable attribute. The kinetic mechanism 260 is shown as a plotted line 262 representing 1/intensity of an optical emission over time. In other words, inverse luminosity intensity as a function of time. Because kinetic mechanism is specific to a given persistent luminescent phosphor compound, the kinetic mechanism 260 may be used to identify which persistent luminescent phosphor compound is present on a reagent strip 10, for instance.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and as defined in the appended claims.

What is claimed is:

1. A reagent analyzer, comprising:
an imager receiving an optical signal and generating a series of images having pixel representations of the optical signal during a time period, the optical signal generated by a photo luminescent phosphor spot on a reagent strip having at least one reagent pad;
a controller having a processor and a non-transitory computer readable memory storing instructions that when executed by the processor cause the controller to:
receive the series of images of the optical signal, including an image file having a first region of pixels corresponding to a first read position of the photo luminescent phosphor spot, and a second region of pixels corresponding to a second read position of the reagent pad;
determine, by analyzing the pixel representations of the series of images, whether or not the optical signal includes at least one predetermined addressable attribute; and
outputting a reading of the reagent pad to an output device responsive to the optical signal including at least one predetermined addressable attribute.

2. The reagent analyzer of claim 1, wherein the controller and the imager are components of a smart telephone.

3. The reagent analyzer of claim 1, further comprising an illumination source illuminating the photo luminescent phosphor spot of the reagent strip with light for a predetermined amount of time at a predetermined intensity to cause the photo luminescent phosphor spot to generate the optical signal.

4. The reagent analyzer of claim 3, wherein the controller, the illumination source, and the imager are components of a smart telephone.

5. The reagent analyzer of claim 1, wherein the at least one predetermined addressable attribute includes two or more predetermined addressable attributes.

6. The reagent analyzer of claim 1, wherein the at least one predetermined addressable attribute is selected from a group consisting of an optical emission, a maximum wavelength, a luminosity decay rate, and a kinetic mechanism.

7. An automated method for verifying a reagent strip having at least one reagent pad, comprising:

illuminating a photo luminescent phosphor spot of a reagent strip by an illumination source with light for a predetermined amount of time at a predetermined intensity;

detecting an optical signal by an imager, the optical signal generated by the photo luminescent phosphor spot; and determining, using processor executable code executed on a processor, whether or not the optical signal includes at least one predetermined addressable attribute; and wherein if at least one of the predetermined addressable attribute is not detected, the reagent strip is rejected and no test result of a test, which is running on the reagent pad of the test strip is stored.

8. The automated method of claim 7, wherein the processor, the illumination source, and the imager are components of a smart telephone.

9. The automated method of claim 7, wherein the illumination source illuminates the photo luminescent phosphor spot of the reagent strip with light for the predetermined amount of time at the predetermined intensity to cause the photo luminescent phosphor spot to generate the optical signal.

10. The automated method of claim 7, wherein the optical signal has a first region corresponding to a first read position of the photo luminescent phosphor spot.

11. The automated method of claim 7, further comprising generating a series of images having pixel representations of the optical signal during a time period, the images having a first region of pixels corresponding to a first read position of the photo luminescent phosphor spot, and a second region of pixels corresponding to a second read position of the reagent pad.

12. The automated method of claim 11, further comprising determining at least one of a presence or an absence of a specific analyte within a sample by analyzing the second region of pixels corresponding to the second read position of the reagent pad.

13. The automated method of claim 7, wherein the at least one predetermined addressable attribute includes two or more predetermined addressable attributes.

14. The automated method of claim 13, wherein the at least one predetermined addressable attribute is selected from a group consisting of an optical emission, a maximum wavelength, a luminosity decay rate, and a kinetic mechanism.

15. An automated method for verifying a reagent strip, comprising:

positioning a predetermined portion of the reagent strip having at least one reagent pad at a first read position in a field of view of an imager;

illuminating the predetermined portion of the reagent strip at the first read position by an illumination source with a light for a predetermined amount of time at a predetermined intensity;

detecting an optical signal by the imager, the optical signal indicative of at least the predetermined portion of the reagent strip at the first read position;

determining, using processor executable code executed on a processor, a luminosity of an optical emission from the predetermined portion in the optical signal;

determining at least one of a first maximum wavelength, a first luminosity decay rate, and a first kinetic mechanism of the optical emission; and comparing the at least one of the first maximum wavelength, first luminosity decay rate, or first kinetic mechanism of the optical emission to a second maximum wavelength, a second luminosity decay rate, and a second kinetic mechanism of an expected persistent luminescent phosphor; and wherein if the at least one of the first maximum wavelength, first luminosity decay rate, or first kinetic mechanism do not match the second maximum wavelength, second luminosity decay rate, or the second kinetic mechanism, the reagent strip is rejected and no test result of a test, which is running on at least one reagent pad is stored.

16. The method of claim 15, wherein at least two of the first maximum wavelength, first luminosity decay rate, and first kinetic mechanism of the optical emission are determined and the method further comprises:

comparing the at least two of the first maximum wavelength, first luminosity decay rate, or first kinetic mechanism of the optical emission to a second maximum wavelength, a second luminosity decay rate, and a second kinetic mechanism of an expected persistent luminescent phosphor; and wherein if the at least two of the first maximum wavelength, first luminosity decay rate, or first kinetic mechanism do not match the second maximum wavelength, second luminosity decay rate, or the second kinetic mechanism, no further analysis is performed on the reagent strip.

17. The method of claim 15, wherein the first maximum wavelength, first luminosity decay rate, and first kinetic mechanism of the optical emission are determined and the method further comprises:

comparing the first maximum wavelength, first luminosity decay rate, and first kinetic mechanism of the optical emission to the second maximum wavelength, the second luminosity decay rate, and the second kinetic mechanism of the expected persistent luminescent phosphor; and wherein if the first maximum wavelength, first luminosity decay rate, and first kinetic mechanism do not match the second maximum wavelength, second luminosity decay rate, and the second kinetic mechanism, no further analysis is performed on the reagent strip.

18. The method of claim 15, wherein the predetermined portion of the reagent strip is sealed.

19. The method of claim 15, wherein the predetermined portion of the reagent strip includes a photo luminescent phosphor spot.

20. A reagent analyzer, comprising:

an imaging system having an imager with a field of view and an illumination source configured to illuminate the field of view of the imager, the imaging system configured to illuminate a reagent strip with the illumination source, and capture an image indicative of an optical emission of a predetermined portion of the reagent strip positioned in the field of view, the image having a region with pixel values depicting a luminosity of the optical emission of the reagent strip and a reagent pad; and a controller having a processor and a non-transitory computer readable memory storing instructions that when executed by the processor cause the controller to:

receive the image and determine the luminosity of the optical emission from the predetermined portion, the luminosity having at least one of a first maximum wavelength, a first luminosity decay rate, and a first kinetic mechanism of the optical emission; and compare the at least one of the first maximum wavelength, first luminosity decay rate, and first kinetic mechanism of the optical emission to a second maximum wavelength, a second luminosity decay rate, and a second kinetic mechanism of an expected persistent luminescent phosphor; and wherein if the processor determines that at least one of the first maximum wavelength, first luminosity decay rate, or first kinetic mechanism do not match the second maximum wavelength, second luminosity decay rate, or the second kinetic mechanism, the instructions cause the controller to reject the reagent strip and no test result of a test, which is running on the reagent pad is stored.

21. The reagent analyzer of claim 20, wherein the predetermined portion of the reagent strip includes a photo luminescent phosphor spot.

22. The reagent analyzer of claim 20, wherein the processor, and the imaging system are components of a smart telephone.

\* \* \* \* \*